(12) United States Patent
Koger

(10) Patent No.: US 6,646,058 B1
(45) Date of Patent: Nov. 11, 2003

(54) WATER-BORNE PAINT COMPOSITION HAVING IMPROVED HIDING AND SCRUB-RESISTANCE

(75) Inventor: Linwood G. Koger, South Euclid, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 55 days.

(21) Appl. No.: 09/789,680

(22) Filed: Feb. 21, 2001

(51) Int. Cl.$^7$ .............................................. C08F 291/04
(52) U.S. Cl. .................... 525/301; 525/221; 526/318.5; 524/430; 524/522; 524/523
(58) Field of Search ................................ 524/430, 522, 524/523; 525/301, 221; 526/318.5

(56) References Cited

U.S. PATENT DOCUMENTS

| | | | |
|---|---|---|---|
| 4,427,836 A | | 1/1984 | Kowalski et al. ............ 525/301 |
| 4,514,552 A | | 4/1985 | Shay et al. .................. 526/301 |
| 4,771,079 A | * | 9/1988 | Melber ........................ 428/207 |
| 4,801,671 A | | 1/1989 | Shay et al. .................. 526/214 |
| 4,894,397 A | * | 1/1990 | Morgan et al. .............. 428/137 |
| 4,916,171 A | | 4/1990 | Brown et al. ................ 523/161 |
| 5,102,936 A | | 4/1992 | Huth et al. .................. 524/247 |
| 5,149,729 A | | 9/1992 | Englund ...................... 524/366 |
| 5,185,387 A | | 2/1993 | Klesse et al. ................ 523/201 |
| 5,208,285 A | | 5/1993 | Boyce et al. ................ 524/516 |
| 5,212,251 A | | 5/1993 | Lorah et al. ................. 525/279 |
| 5,227,423 A | | 7/1993 | Ingle ........................... 524/458 |
| 5,292,843 A | * | 3/1994 | Jenkins et al. ............ 526/318.5 |
| 5,294,693 A | | 3/1994 | Egraz et al. ................. 526/310 |
| 5,488,180 A | | 1/1996 | Jenkins et al. ............... 568/609 |
| 5,527,613 A | * | 6/1996 | Blankenship et al. .. 428/402.24 |
| 5,609,965 A | * | 3/1997 | Esser ........................ 427/385.5 |
| 5,639,805 A | | 6/1997 | Park et al. ................... 523/201 |
| 5,643,993 A | | 7/1997 | Guerin ......................... 524/524 |
| 5,739,196 A | | 4/1998 | Jenkins et al. ............... 524/460 |
| 5,756,273 A | * | 5/1998 | Wang et al. ................. 430/537 |
| 6,013,324 A | * | 1/2000 | Frangou et al. ........... 427/388.4 |

FOREIGN PATENT DOCUMENTS

| | | | |
|---|---|---|---|
| WO | WO 00/75205 A1 | 12/2000 | ......... C08F/220/04 |
| WO | WO 00/75247 A2 | 12/2000 | ......... C09D/129/00 |

OTHER PUBLICATIONS 3 pages of the International Search Report for International Application No. PCT/US02/01600 corresponding to U.S. Ser. No. 09/789,680.

* cited by examiner

Primary Examiner—David W. Wu
Assistant Examiner—Henry S. Hu
(74) Attorney, Agent, or Firm—Paul R. Katterle; Robert E. McDonald; Vivien Y. Tsang

(57) ABSTRACT

A water-borne paint composition including an opacifying pigment, a core-shell polymer with acid functionality, and a polymer polymerized from a group of monomers including a macromonomer having a hydrophobic portion and an alkoxylated portion. The core-shell polymer includes a shell and a core, wherein the weight of the shell is less than 10% of the weight of the core.

20 Claims, No Drawings

WATER-BORNE PAINT COMPOSITION HAVING IMPROVED HIDING AND SCRUB-RESISTANCE

BACKGROUND OF THE INVENTION

This invention relates to coatings and in particular to water-borne paint compositions having improved hiding.

Generally, a water-borne paint composition is composed of four basic components: binder, aqueous carrier, pigment (s) and additive(s). The binder is a nonvolatile resinous material that is dispersed in the aqueous carrier to form a latex. When the aqueous carrier evaporates, the binder forms a paint film that binds together the pigment particles and other non-volatile components of the water-borne paint composition.

The pigment(s) used in a water-borne paint composition typically include an opacifying pigment, which imparts opacity or hiding to the paint film. One of the most effective and, hence, one of the most widely used opacifying pigments is titanium dioxide. Although very effective, titanium dioxide is expensive, typically being the most expensive component of a water-borne paint composition. Accordingly, it is desirable to achieve the desired degree of hiding in a paint film using the least amount of titanium dioxide possible. Various paint compositions have been proposed for utilizing titanium dioxide more efficiently; however, most of these paint compositions have reduced scrub resistance.

Based on the foregoing, there is a need in the art for a water-borne paint composition having improved hiding and good scrub resistance. The present invention is directed to such a water-borne paint composition.

SUMMARY OF THE INVENTION

In accordance with the present invention, a water-borne paint composition is provided that includes an opacifying pigment and a core-shell polymer with acid functionality. The core-shell polymer includes a shell and a core. The weight of the shell is less than 10% of the weight of the core. The water-borne paint composition also includes a polymer polymerized from a group of monomers including an unsaturated carboxylic acid monomer, a monoethically unsaturated monomer different from the carboxylic acid monomer, and a macromonomer including a hydrophobic portion and an alkoxylated portion that is polymerizable with the carboxylic acid monomer and the monoethylenically unsaturated monomer.

Also provided in accordance with the present invention is a water-borne paint composition that includes an opacifying pigment, a binder latex having a core-shell polymer with acid functionality, and a dispersant polymer polymerized from a group of monomers including a macromonomer having a hydrophobic portion and an alkoxylated portion. The core-shell polymer has a core and a shell respectively polymerized from first and second sets of monomers, each of which includes at least 48 weight percent of one or more vinyl monomers. The weight of the shell is less than 10% of the weight of the core.

DETAILED DESCRIPTION OF THE INVENTION

Parts are parts by weight and percents are weight percents unless otherwise indicated or apparent.

As used herein with regard to a paint composition, the term "pigment volume concentration" (hereinafter referred to as "PVC") means the ratio (expressed as a percentage) of the volume of inorganic particles (i.e., opacifying pigment and extender particles) to the volume of total non-volatile material (i.e., inorganic particles and polymeric particles) present in the paint composition.

As used herein with regard to a paint composition, the term "total solids by volume" means the ratio (expressed as a percentage) of the volume of total non-volatile material (i.e., inorganic particles and polymeric particles) present in the paint composition to the total volume of the paint composition.

As used herein, "(meth)acrylate" denotes both "acrylate" and "methacrylate", and "(meth)acrylic" denotes both "methacrylic" and "acrylic."

As used herein, the term "vinyl monomer" means any monomer having vinyl functionality, i.e., ethylenic unsaturation, exclusive of monomers having acrylic functionality.

The water-borne paint composition of the present invention includes a binder latex comprising a core-shell polymer, a dispersant latex formed from a monomer mixture comprising a macromonomer, and an opacifying pigment. The water-borne paint composition also preferably includes an extender and a thickener.

The binder latex comprises a core-shell polymer dispersed in an aqueous medium. The core-shell polymer comprises a core polymer having an outer surface and a shell polymer in physical contact with and covering at least a part of the outer surface of the core polymer. The core-shell polymer is formed using a two-stage free radical emulsion polymerization technique. In a first stage, the core polymer is polymerized from a first set of monomers in an emulsion. In a second stage, a second set of monomers is added to the emulsion and polymerized to form the shell polymer. The core-shell polymer does not have cross-linking functionality.

Suitable monomers for producing the core and shell polymers include copolymerizable monoethylenically unsaturated monomers, such as vinyl monomers and acrylic monomers. None of the monomers used to produce the core and shell polymers have "latent cross-linking capability", which, as used herein, means the ability to further react some time after initial polymer formation.

Preferred vinyl monomers are selected from the group consisting of vinyl esters, vinyl aromatic hydrocarbons, vinyl aliphatic hydrocarbons, vinyl alkyl ethers and mixtures thereof. Examples of vinyl esters that may be used include vinyl acetate, vinyl propionate, vinyl laurate, vinyl pivalate, vinyl nonanoate, vinyl decanoate, vinyl neodecanoate, vinyl butyrates, vinyl benzoates, and vinyl isopropyl acetates. Examples of vinyl aromatic hydrocarbons that may be used include styrene, methyl styrenes and other lower alkyl styrenes, chlorostyrene, vinyl toluene, vinyl naphthalene and divinyl benzene. Examples of vinyl aliphatic hydrocarbons that may be used include vinyl chloride and vinylidene chloride as well as alpha olefins such as ethylene, propylene, isobutylene, as well as conjugated dienes such as 1,3 butadiene, methyl-2-butadiene, 1,3-piperylene, 2,3-dimethyl butadiene, isoprene, cyclohexene, cyclopentadiene, and dicyclopentadiene. Examples of vinyl alkyl ethers that may be used include methyl vinyl ether, isopropyl vinyl ether, n-butyl vinyl ether, and isobutyl vinyl ether.

Acrylic monomers suitable for use in the present invention include any compounds having acrylic functionality. Preferred acrylic monomers are selected from the group consisting of alkyl (meth)acrylates, acrylic acids, as well as aromatic derivatives of (meth)acrylic acid, acrylamides and acrylonitrile. Typically, the alkyl (meth)acrylate monomers (also referred to herein as "alkyl esters of (meth)acrylic acid") will have an alkyl ester portion containing from 1 to 12, preferably about 1 to 5, carbon atoms per molecule.

Suitable acrylic monomers include, for example, methyl (meth)acrylate, ethyl (meth)acrylate, butyl (meth)acrylate, propyl (meth)acrylate, 2-ethyl hexyl (meth)acrylate, cyclohexyl (meth)acrylate, decyl (meth)acrylate, isodecyl (meth)acrylate, benzyl (meth)acrylate, isobomyl (meth)acrylate, neopentyl (meth)acrylate, 1-adamatyl methacrylate and various reaction products such as butyl, phenyl, and cresyl glycidyl ethers reacted with (meth)acrylic acid, hydroxyl alkyl (meth)acrylates, such as hydroxyethyl and hydroxypropyl (meth)acrylates, amino (meth)acrylates, as well as acrylic acids such as (meth)acrylic acid, ethacrylic acid, alpha-chloroacrylic acid, alpha-cycanoacrylic acid, crotonic acid, beta-acryloxy propionic acid, and beta-styryl acrylic acid.

Preferably, the first and second sets of monomers each include a vinyl monomer and an acrylic monomer. The first and second sets of monomers each preferably comprise at least 48 weight percent, more preferably from about 48 to about 90 weight percent, more preferably from about 58 to about 88 weight percent, more preferably from about 65 to about 85 weight percent of one or more vinyl monomers.

Importantly, the second set of monomers includes an acid functional monomer. Suitable acid functional monomers include (meth)acrylic acid and other unsaturated acid monomers such as maleic acid, crotonic acid, fumaric acid, itaconic acid, vinyl benzoic acid and isoprenyl benzoic acid. Preferred acid functional monomers include methacrylic acid and acrylic acid, with methacrylic acid being more preferred. Preferably, the second set of monomers comprises from about 2 to about 20 weight percent, more preferably from about 6 to about 15 weight percent, more preferably from about 8 to about 12 weight percent, still more preferably about 10 weight percent of one or more acid functional monomers.

The first set of monomers may also include an acid functional monomer, but in an amount less than in the second set of monomers. If present, the acid functional monomer comprises less than about 3 weight percent, more preferably less than about 2 weight percent of the first set of monomers.

In a preferred embodiment of the present invention, the first set of monomers comprises a vinyl ester monomer and an acrylic ester monomer, and the second set of monomers comprises a vinyl ester monomer, an acrylic ester monomer, and an acrylic acid. Preferably, the first set of monomers comprises from about 10 to about 50 weight percent, more preferably from about 10 to about 35 weight percent, more preferably from about 15 to about 25 weight percent, still more preferably about 19 weight percent acrylic ester monomer, and from about 50 to about 90 weight percent, more preferably from about 65 to about 90 weight percent, more preferably from about 75 to about 85 weight percent, still more preferably about 81 weight percent vinyl ester monomer. Preferably, the second set of monomers comprises from about 10 to about 50 weight percent, more preferably from about 14 to about 34 weight percent, more preferably from about 16 to about 26 weight percent, still more preferably about 18 weight percent acrylic ester monomer, and from about 48 to about 88 weight percent, more preferably from about 60 to about 80 weight percent, more preferably from about 66 to about 76 weight percent, still more preferably about 72 weight percent vinyl ester monomer, and from about 2 to about 20 weight percent, more preferably from about 6 to about 15 weight percent, more preferably from about 8 to about 12 weight percent, still more preferably about 10 weight percent of an acrylic acid. In the first set of monomers, the acrylic ester monomer is preferably butyl acrylate and the vinyl ester monomer is preferably vinyl acetate. In the second set of monomers, the acrylic ester monomer is preferably butyl acrylate, the vinyl ester monomer is preferably vinyl acetate, and the acrylic acid is preferably methacrylic acid.

The amount of the shell polymer relative to the amount of the core polymer present in the core-shell polymer is an important aspect of the present invention. Applicant has surprisingly and unexpectedly found that when the amount of the shell polymer is less than 10 weight percent of the amount of the core polymer, the water-borne paint composition of the present invention provides good scrub-resistance as well as good hiding. Preferably, the amount of the shell polymer is less than 10 weight percent, more preferably less than 9 weight percent, more preferably from about 0.5 to about 8 weight percent, more preferably from about 0.5 to about 7 weight percent, more preferably from about 1 to about 6 weight percent, more preferably from about 1 to about 5 weight percent, still more preferably from about 1 to about 3 weight percent of the core polymer.

The Tg of the core polymer and the shell polymer is preferably from about −40° C. to about 40° C., more preferably from about −10° to about 30° C., still more preferably from about 5° to about 25° C.

Preferably, the core polymer has a higher molecular weight than the shell polymer. The core polymer preferably has a weight average molecular weight greater than 50,000, while the shell polymer preferably has a weight average molecular weight of about 5,000 to about 50,000. If desired, a chain transfer agent can be used to control the molecular weight of the core polymer and/or the shell polymer. The particle size of the core-shell polymer is preferably from about 0.05 to about 1.0 micron, more preferably from about 0.1 to about 0.5 micron, still more preferably from about 0.2 to about 0.4 micron.

As set forth above, the free radical emulsion polymerization process for producing the core-shell polymer is performed in two stages. Preferably, the first stage is performed using a feed system. Generally, this feed system can be described as follows. A reactor is charged with an aqueous medium and a small amount of an initiator. A first monomer mixture is formed comprising the first set of monomers dispersed in an aqueous medium. An initiator mixture is formed comprising a larger amount of the initiator and an aqueous medium. The first monomer mixture and the initiator mixture are held in separate feed vessels. The aqueous medium in the reactor is heated to a reaction temperature, generally in a range from about 70° C. to about 90° C. A portion of the first monomer mixture is added to the reactor to form a seed latex in the reactor. While the seed latex is stirred and maintained at the reaction temperature, the first initiator mixture and the remainder of the first monomer mixture are fed into the reactor, for example by syringe pumps or other pumping devices. Preferably, the rate of feed is determined by the rate at which the first set of monomers present in the reactor undergo polymerization. The feed is generally carried out over a period of time from about 0.5 hours to about 6 hours, usually between about 0.5 and 3.5 hours. After complete addition of the monomer mixture, the reaction mixture is typically held at the reaction temperature for another 30 minutes to 1 hour. The resulting emulsion comprising the core polymer is retained in the reactor for the second stage.

A second monomer mixture comprising the second set of monomers and an aqueous medium is formed, and in another, separate vessel, a second initiator mixture comprising the initiator and an aqueous medium is formed. In the second stage, the second monomer mixture is added to the emulsion in the reactor over a brief period of time, generally less than 0.5 hours. The second initiator mixture is then added to the reactor and the reaction is allowed to proceed for generally about an hour.

At the end of the second stage of the emulsion polymerization, a neutralizing agent or base is preferably added to the emulsion to neutralize and at least swell the shell polymer. Suitable bases include ammonia, triethylamine, monoethanolamine, dimethylaminoethanol, ammonium hydroxide, and Group IA and Group IIA hydroxides, such as sodium hydroxide and potassium hydroxide. Based on the equivalents of acid in the shell polymer, 0.01 to 1.5 equivalents of base may be added.

The amount of the core-shell polymer in the water-borne paint composition of the present invention, on a solids basis, is preferably from about 5 to about 80 weight percent, more preferably from about 10 to about 60 weight percent, still more preferably from about 20 to about 40 weight percent, based on the total weight of solids of the water-borne paint composition.

The dispersant latex of the present invention comprises a dispersant polymer dispersed in an aqueous medium. The dispersant polymer does not have cross-linking functionality. The dispersant polymer is the reaction product of a group of monomers comprising an unsaturated carboxylic acid monomer, a monoethylenically unsaturated monomer different from the carboxylic acid monomer, and a macromonomer comprising a hydrophobic portion and an alkoxylated portion that is polymerizable with the other monomers. The group of monomers used to form the dispersant polymer does not include a monomer having latent cross-linking capability.

The unsaturated carboxylic acid monomers suitable for use in accordance with the present invention are typically $\alpha,\beta$-monoethylenically unsaturated carboxylic acids. Preferred carboxylic acid monomers are selected from the group consisting of (meth)acrylic acid, crotonic acid, itaconic acid, maleic acid, and mixtures thereof. Methacrylic acid is especially preferred. The amount of the carboxylic acid monomer is preferably from about 20 to about 70 weight percent, more preferably from about 20 to about 50 weight percent, more preferably from about 35 to about 45 weight percent, still more preferably about 40 weight percent, based on the total weight of the dispersant polymer. The amount of the carboxylic acid monomer is preferably sufficient to provide a polymeric structure that will solubilize and provide viscosity enhancement when reacted with an alkali such as for example, sodium hydroxide.

In accordance with the present invention, the monoethylenically unsaturated monomer different from the carboxylic acid monomer preferably comprises an ethyl group. More preferably, this monomer is an acrylate. Still more preferably, this monomer is ethyl acrylate. The amount of the monoethylenically unsaturated monomer different from the carboxylic acid monomer is preferably from about 5 to about 70 weight percent, more preferably from about 10 to about 50 weight percent, more preferably from about 10 to about 30 weight percent, still more preferably about 20 weight percent, based on the total weight of the dispersant polymer.

The macromonomers suitable for producing the dispersant polymer in accordance with the present invention comprise a hydrophobic portion and an alkoxylated portion that is polymerizable with other monomer(s). As used herein, the term "macromonomer" means a polymerizable monomer that comprises the reaction product of two or more compounds. Such macromonomers include, for example, any alkoxylated, e.g., ethoxylated or propoxylated, monomers having ethylenic unsaturation and that are terminated by a hydrophobic fatty chain. Examples of unsaturated, polymerizable moieties include those selected from the group consisting of vinyl group containing moieties, methacryloyl, maleoyl, itaconoyl, crotonyl, an unsaturated urethane moiety, hemiester maleoyl, hemiester itaconoyl, $CH_2=CHCH_2—O—$, methacrylamido and substituted methacrylamido. Examples of hydrophobic moieties include those selected from the group consisting of alkyl, alkaryl (i.e., alkylaryl or aralkyl), aryl, linear, branched, saturated, and unsaturated, and having at least 6 carbon atoms, preferably from about 6 to about 30 carbon atoms per molecule.

Preferred macromonomers are urethane monomers that comprise the reaction product of a monohydric surfactant and a monoethylenically unsaturated isocyanate. Preferably, the urethane monomer is a nonionic urethane monomer that is the urethane reaction product of a monohydric nonionic surfactant with a monoethylenically unsaturated monoisocyanate, preferably one lacking ester groups, e.g., alpha, alpha-dimethyl-m-isopropenyl benzyl isocyanate. The monohydric nonionic surfactants are themselves well known and are usually alkoxylated, e.g., ethoxylated, hydrophobes containing adducted ethylene oxide to provide the hydrophilic portion of the molecule. The hydrophobes are usually aliphatic alcohols or alkyl phenols in which a carbon chain containing at least 6 carbon atoms, preferably about 6 to about 30 carbon atoms, provides the hydrophobic portion of the surfactant. These surfactants are illustrated by ethylene oxide adducts of dodecyl alcohol or octyl or nonyl phenol which are available in commerce and which contain about 5 to about 150, preferably 25 to about 60 moles of ethylene oxide per mole of hydrophobe. Other hydrophobic substituents, such as complex hydrophobes, disclosed for example in U.S. Pat. No. 5,488,180 issued Jan. 30, 1996, are suitable for use in accordance with the present invention.

The monoethylenically unsaturated isocyanates suitable for use in preparing the urethane monomers can be any isocyanates effective to form the desired urethane linkage. Preferably, the isocyanate is a monoethylenically unsaturated monoisocyanate. Any copolymerizable unsaturation may be employed, such as acrylate and methacrylate unsaturation. One may also use allylic unsaturation, as provided by allyl alcohol. These, preferably in the form of a hydroxy-functional derivative, as is obtained by reacting a C2–C4 monoepoxide, like ethylene oxide, propylene oxide or butylene oxide, with acrylic or methacrylic acid to form an hydroxy ester, are preferably reacted in equimolar proportions with an organic diisocyanate, such as toluene diisocyanate or isophorone diisocyanate. The preferred monoethylenic monoisocyanate is styryl, as in alpha, alpha-dimethyl-m-isopropenyl benzyl isocyanate, and this unsaturated monoisocyanate lacks the ester group so it forms urethanes which lack this group. The amount of the monoethylenically unsaturated isocyanate relative to the monohydric surfactant used in making the macromonomer, (on a mole ratio basis) is preferably from about 0.1–2.0 to 1, more preferably about 1.0 to 1.0.

Suitable macromonomers useful in this invention can also be represented by the formula:

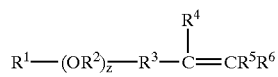

wherein:
$R^1$ is a monovalent residue of a substituted or unsubstituted hydrophobe compound;
each $R^2$ is the same or different and is a substituted or unsubstituted divalent hydrocarbon residue;
$R^3$ is a substituted or unsubstituted divalent hydrocarbon residue;
$R^4$, $R^5$, $R^6$ are the same or different and are hydrogen or a substituted or unsubstituted monovalent hydrocarbon residue;
and z is a value of 0 to 150.

Illustrative $R^1$ substituents include, for example, simple or complex hydrophobe containing from 1 to 30 carbon atoms such as alkyl, aryl, aralkyl, alkaryl and cycloakyl groups.

Illustrative $R^3$ substituents include, for example, the organic residue of ethers, esters, urethanes, amides, ureas, anhydrides and the like including mixtures thereof. The $R^3$ substituent can be generally described as a "linkage" between the hydrophobe bearing surfactant or alcohol and the unsaturated portion of the macromonomer compound.

The oxyalkylene moieties included in the macromonomer compounds may be homopolymers or block or random copolymers of straight or branched alkylene oxides. Mixtures of alkylene oxides such as ethylene oxide and propylene oxides may also be employed.

Further details concerning the preparation of such macromonomers are known to those skilled in the art and are disclosed, for example, in U.S. Pat. Nos. 4,514,552, 4,801,671, 5,292,828, 5,292,843 and 5,294,693, incorporated herein by reference.

The amount of the macromonomer is preferably from about 0.5 to about 60 weight percent, more preferably from about 5 to about 50 weight percent, more preferably from about 35 to about 45 weight percent, still more preferably about 40 weight percent, based on the total weight of the dispersant polymer. Typically, the molecular weight of the macromonomer ranges from about 400 to 8000 grams per gram mole.

Typically, the viscosity of the dispersant latex of the present invention is from about 5 to 1500 cP in the un-neutralized form measured at 20° C. with a 20 to 50 weight percent solids composition using a Brookfield Viscometer with a number 2 spindle at 60 revolutions per minute. The molecular weight of the dispersant polymer of the present invention is preferably from about $10^3$ to $1^6$, more preferably from about 5,000 to 10,000 grams per gram mole. If desired, a chain transfer agent can be used to control the molecular weight of the dispersant polymer. Preferably, the particle size of the dispersant polymer is from about 0.05 to 1.0 microns, preferably from about 0.1 to 0.4 microns and more preferably from about 0.1 to 0.3 microns. The Tg of the dispersant polymer of the present invention is preferably from about 0° C. to about 90° C., more preferably from about 5° C. to about 60° C. and still more preferably from about 15° C. to about 35° C.

Preferably, the dispersant latex is formed by free radical emulsion polymerization using a feed system. Generally, this feed system can be described as follows. A reactor is charged with an aqueous medium. A monomer mixture is formed comprising the unsaturated carboxylic acid monomer, the monoethylenically unsaturated monomer different from the carboxylic acid monomer, and the macromonomer dispersed in an aqueous medium. An initiator mixture is formed comprising an initiator and an aqueous medium. The monomer mixture and the initiator mixture are held in separate feed vessels. The aqueous medium in the reactor is heated to a reaction temperature, generally in a range from about 70° C. to about 90° C. Portions of the monomer mixture and initiator mixture are added to the reactor to form a seed latex in the reactor. While the seed latex is stirred and maintained at the reaction temperature, the remainder of the initiator mixture and the monomer mixture are fed into the reactor, for example by syringe pumps or other pumping devices. Preferably, the rate of feed is determined by the rate at which the monomers present in the reactor undergo polymerization. The feed is generally carried out over a period of time from about 0.5 hours to about 6 hours, usually between about 0.5 and 3.5 hours. After complete addition of the monomer mixture, the reaction mixture is typically held at the reaction temperature for another 30 minutes to 1 hour.

The amount of dispersant polymer in the water-borne paint composition of the present invention, on a solids basis, is preferably from about 0.1 to about 10 weight percent, more preferably from about 0.1 to about 5 weight percent, still more preferably from about 0.3 to about 3 weight percent, based on the total weight of solids of the water-borne paint composition.

The aqueous media used in the polymerization of the core-shell polymer and in the polymerization of the dispersant polymer comprises water and preferably a surfactant. Suitable surfactants include anionic surfactants such as sodium lauryl sulfate, sodium tridecylether sulfate, diester sulfosuccinates and sodium salts of alkyl aryl polyether sulfonates; and nonionic surfactants such as alkyl aryl polyether alcohols and ethylene oxide condensates of propylene oxide, propylene glycol adducts.

In the polymerization of the core-shell polymer and the dispersant polymer, the initiator is preferably used in an amount sufficient to catalyze the polymerization reactions. This amount will typically vary from about 0.01 to 3 weight percent based on the weight of monomers charged. However, the concentration of the initiator is preferably from about 0.05 to about 2 weight percent and, more preferably, from about 0.1 to about 1 weight percent of the monomers charged. The particular amount used in any instance will depend upon the specific monomer mixture undergoing reaction and the specific initiator employed, which details are known to those skilled in the art. Suitable initiators that may be used in the polymerization of the core-shell polymer and in the polymerization of the dispersant polymer include hydrogen peroxide, peracetic acid, t-butyl hydroperoxide, di-t-butyl hydroperoxide, dibenzoyl peroxide, benzoyl hydroperoxide, 2,4-dicholorbenzoyl peroxide, 2,5-dimethyl-2,5-bis(hydroperoxy) hexane, perbenzoic acid, t-butyl peroxypivalate, t-butyl peracetate, dilauroyl peroxide, dicapryloyl peroxide, distearoyl peroxide, dibenzoyl peroxide, diisopropyl peroxydicarbonate, didecyl peroxydicarbonate, dicicosyl peroxydicarbonate, di-t-butyl perbenzoate, 2,2'-azobis-2,4-dimethylvaleronitrile, ammonium persulfate, potassium persulfate, sodium persulfate, sodium perphosphate, azobisisobutyronitrile, as well as any of the other known initiators. Also useful are the redox catalyst systems such as sodium persulfate-sodium formaldehyde sulfoxylate, cumene hydroperoxide-sodium metabisulfite, hydrogen peroxide-ascorbic acid, and other known redox systems. Moreover, as known by those skilled in the art, traces of metal ions can be added as activators to improve the rate of polymerization, if desired.

Examples of chain transfer agents that may be used in the polymerization of the core-shell polymer and the dispersant polymer include: alkyl mercaptans, such as n-octyl mercaptan, n-decyl mercaptan, and n-dodecyl mercaptan; and mercapto carboxylic acids and their esters, such as methylmercaptoproionate and 3-mercaptopropionic acid. If used, the chain transfer agent generally comprises from about 0.1 to about 10% by weight of the total weight of the monomers and is added along with the monomer feeds as is customary in emulsion polymerization reactions. Polymer molecular weight can be controlled by other techniques known in the art as well, such as by selecting the ratio of initiator to monomer.

The opacifying pigment used in the water-borne paint composition of the present invention may be titanium dioxide ($TiO_2$), zinc oxide ($ZnO_2$), calcium carbonate ($CaCO_3$), talc, clay materials, or other known opacifying pigment. Preferably the opacifying pigment is titanium dioxide, which may comprise anatase titanium dioxide or rutile titantium dioxide, or a mixture of the two. Preferably, the opacifying pigment comprises rutile titanium dioxide, to the exclusion of anatase titanium dioxide. Preferably, the rutile titanium dioxide is surface treated with an inorganic oxide, such as silica ($SiO_2$). Generally, titanium dioxide has a particle size of from about 0.2 to about 0.3 microns in diameter and is provided in powder form, or in an aqueous slurry. An example of a titanium dioxide that is suitable for use in the present invention is Ti-Pure® R-706, which is commercially available from E.I. du Pont de Nemours and Company. Ti-Pure® R-706 titanium dioxide is a rutile titanium dioxide that is surface treated with silica.

A grind slurry is formed by dispersing the opacifying pigment into a vehicle comprising an aqueous medium and the dispersant latex. The opacifying pigment is dispersed into the vehicle using a ball mill, sand mill, high-shear fluid flow mill, or the like. The process of dispersing breaks up agglomerates of opacifying pigment particles to form a better particle distribution, and wetts the opacifying pigment particles with the vehicle. Such wetting inhibits the reagglomeration of the opacifying pigment particles. The resulting grind slurry can be characterized as the dispersion of opacifying pigment and a minor amount of the dispersant polymer in an aqueous medium.

The amount of opacifying pigment in the water-borne paint composition of the present invention, on a solids basis, is preferably from about 5 to about 50 weight percent, more preferably from about 5 to about 35 weight percent, still more preferably from about 5 to about 25 weight percent, based on the total weight of solids of the water-borne paint composition.

The water-borne paint composition of the present invention preferably includes an extender to help space apart the particles of the opacifying pigment. Examples of extenders that may be used include silicates, diatomaceous earth, china clay, asbestine, barytes, silica, mica, and microspheres. Preferably, the extender is selected from the group consisting of diatomaceous earth, microspheres, and mixtures thereof. The microspheres may be glass, ceramic, or polymeric, and can be filled or hollow. Preferably, the microspheres are hollow have an outside diameter of from about 0.1 microns to about 10 microns, and are composed of a polymer, such as an acrylic polymer, or a styrene-acrylic copolymer. The walls of the hollow microspheres preferably have micropores formed therein to permit water to diffuse therethrough. In this manner, when the water-borne paint composition of the present invention dries, water diffuses from the center of the microspheres and is replaced by air, resulting in discrete encapsulated air voids uniformly dispersed throughout the dry paint film. The encapsulated air voids promote hiding when the paint film dries and light is scattered as it passes from the exterior of the beads to the interior microvoids. An example of a microsphere that is suitable for use in the present invention is Ropaque® OP-96 commercially available from Rohm & Haas Co. in Philadelphia, Pa.

Ropaque® OP-96 is a water based emulsion of styrene/acrylic copolymer microspheres.

The amount of extender in the water-borne paint composition of the present invention, on a solids basis, is preferably from 0 to about 40 weight percent, more preferably from 0 to about 30 weight percent, still more preferably from about 5 to about 20 weight percent, based on the total weight of solids of the water-borne paint composition.

The water-borne paint composition of the present invention preferably includes a thickener. Any suitable alkali soluble thickener may be utilized. Examples of suitable alkali soluble thickeners are disclosed, for example, in U.S. Pat. Nos. 4,514,552, 4,722,962, 5,292,828 and 5,292,843, which are incorporated herein by reference. Preferably, the alkali soluble thickener comprises the aqueous emulsion reaction product of an unsaturated carboxylic acid monomer, e.g., methacrylic acid; a monoethylenically unsaturated monomer different from the carboxylic acid monomer, e.g. ethyl acrylate; and a macromonomer comprising a hydrophobic portion and an alkoxylated portion that is polymerizable with the other monomers. Preferably, the macromonomer is a urethane monomer which is the urethane reaction product of a monohydric surfactant and a monoethylenically unsaturated monoisocyanate. The monohydric surfactant may comprise an ethyloxated or propoxylated aliphatic alcohol or alkyl phenol. In a preferred aspect of the present invention, the thickener is prepared using monomers such as those described above with respect to the preferred dispersant polymer.

The viscosity of the thickener is preferably from about 5 to 1500 cP in the un-neutralized form measured at 20° C. with a 20 to 50 weight percent solids composition using a Brookfield Viscometer with a number 2 spindle at 60 revolutions per minute. The molecular weight of the thickener is preferably from about $10^4$ to $10^7$, more preferably from about 20,000 to 200,000 grams per gram mole. Preferably, the particle size of the thickener is from about 0.05 to 1.0 microns, more preferably from about 0.1 to 0.4 microns, and still more preferably from about 0.1 to 0.3 microns. The Tg of the thickener is preferably from about 0 to 90° C., more preferably from about 5 to 60° C., and still more preferably from about 15 to 55° C. An example of a thickener that is suitable for use in the present invention is Polyphobe® 102, which is commercially available from Union Carbide Corporation, Danbury, Conn.

The amount of the thickener in the water-borne coating composition of the present invention, on a solids basis, is preferably from about 0.05 to about 20 weight percent, more preferably from about 0.5 to about 10 weight percent, still more preferably from about 1 to about 3 weight percent, based on the total weight of solids of the water-borne coating composition.

The water-borne coating composition of the present invention is produced using techniques known to those skilled in the art of manufacturing paint. In addition to the binder latex, the dispersant latex, the extender, and the thickener, the water-borne coating composition may contain conventional additives such as coalescing aids, biocides, anti-foaming agents, freeze-thaw additives, and the like. It should also be appreciated that in addition to the opacifying pigment and the extender, small amounts of other pigments or colorants may be used to provide desired coloration or to confer other optical effects.

The water-borne coating composition preferably has a PVC of from about 10 percent to about 70 percent, more preferably from about 20 percent to about 50 percent, still more preferably about 30 percent. The total solids by volume of the water-borne composition is preferably from about 20 percent to about 60 percent, more preferably from about 25 percent to about 50 percent, still more preferably about 30 percent.

The water-borne paint composition of the present invention provides exceptional hiding and scrub resistance. The water-borne paint composition of the present invention can be formulated to give the same hiding as conventional water-borne paint compositions, but with lower levels of opacifying pigment, which in the case of titanium dioxide, provides significant cost savings.

The present invention will be better understood by reference to the following examples, which are provided for purposes of illustration only and are not to be construed as limiting the scope of the present invention.

EXAMPLE 1

Preparation of Core-Shell Binder Latex With Thin Shell

A two-liter resin flask with monomer addition inlets and a water jacket is provided. The resin flask is equipped with a four-blade stainless steel mechanical stirrer, Claisen connecting tube, Friedrichs water condenser, nitrogen sparge and bubble trap, and a thermometer. The resin flask is charged with 500 g of water, 14 g of Aerosol A102 (a surfactant from CYTEC), and 0.4 g ammonium persulfate. A first monomer mixture is prepared by mixing together 228 g of butyl acrylate and 944 g of vinyl acetate. The first monomer mixture is added to a stirred mixture of 360 g deionized water, 40 g of Aerosol A102 in a 2-liter monomer feed cylinder. In a separate feed cylinder, a first initiator solution is prepared by dissolving 3.2 g of ammonium persulfate in 200 g of water. Under nitrogen purge, the resin flask is heated to 73° C. by circulating temperature-controlled water through the jacket. After the temperature of the charge in the resin flask has reached 73° C., 10% of the first monomer mixture is added to the resin flask. Ten minutes later, feeds of the first initiator solution and the first monomer mixture are started. With continuous stirring, the first initiator solution and the remainder of the first monomer mixture are fed to the resin flask over a 3 hour period, while the reaction temperature is held at 73° C. The reaction is allowed to proceed at 73° C. for an additional hour after completion of the feed of the first monomer mixture.

A second monomer mixture is prepared by mixing together 3 g of butyl acrylate, 11.8 g of vinyl acetate, and 1.6 g of methacrylic acid. A second initiator solution is prepared by dissolving 0.08 g of ammonium persulfate in 5 g of water. The second monomer mixture is fed to the resin flask over a 20 minute period, and then the second initiator solution is charged to the resin flask. The reaction is allowed to proceed at 73° C. for an additional hour after completion of the feed of the second monomer mixture. A 15% ammonium hydroxide solution is added to the reaction mixture to provide it with a pH of 5. The resulting product shall hereinafter be referred to as "Core-Shell Binder B1".

EXAMPLE 2

Preparation of Macromonomer With Small Hydrophobe

A one-liter glass reactor is provided. The reactor is fitted with a thermometer, heating mantle, thermo-regulator, stirrer, nitrogen sparge, and condenser including a Dean-Stark trap. The reactor is charged with 930 grams of a 40 mole ethoxylate of nonyl phenol, i.e., a small hydrophobe. The reactor contents are heated, with nitrogen sparging, to 110° C. and held for two hours while trace moisture is removed and collected in the Dean-Stark Trap (typically less than 1 g). The reactor contents are then cooled to 80° C., the Dean Stark trap is replaced with a condenser, and the nitrogen sparge is switched to an air sparge for 15 minutes. With continued air sparging, 0.02 g methoxy-hydroquinone inhibitor, 0.50 g dibutyl tin dilaurate catalyst, and 99.7 g of alpha, alpha-dimethyl-m-isopropenyl benzyl isocyanate (m-TMI, a product of CYTEC, Stamford, Conn.) are charged in order to the reactor. After a rapid initial exotherm, which increases the reaction temperature about 8° C., the contents are maintained at 80° C. for an additional two hours. The product is then cooled to room temperature. The final product is a white wax in appearance with residual isocyanate content of 0.5% and with 98% of the original ethylenic unsaturation retained (referred to hereinafter as "Macromonomer M1").

EXAMPLE 3

Preparation of Dispersant With High Level of Macromonomer

A three-liter resin flask is provided. The resin flask is equipped with a thermometer, stirrrer, condenser, nitrogen inlet, thermo-regulated water bath and monomer addition pump. The resin flask is charged with 525.5 g of deionized water, then heated to 80° C. and purged with nitrogen.

A pre-emulsion of monomers is prepared in a separate stirred container by charging, in order, 2300 g deionized water, 81.6 g sulfonated octyl phenol ethoxylate containing about 10 moles of adducted ethylene oxide per mole of phenol (Alipal EP-110 surfactant, a product of GAF, may be used) and a monomer blend consisting of 159 g ethyl acrylate, 318 g methacrylic acid, 16 g of t-dodecyl mercaptan, and 318 g of the macromonomer M1 prepared in Example 2.

Under a nitrogen blanket, 145 g (10%) of the monomer pre-emulsion is charged to the reactor, followed by 10 g of 5% sodium persulfate solution. The contents exotherm to about 85° C. and, after cooling back to 80° C., the addition of the remaining pre-emulsion is started and continued progressively over 2.5 hours until complete. The reactor contents are heated for an additional 30 minutes at 80° C. to complete the conversion of monomer to copolymer and then cooled. The resulting product is a low viscosity latex of solids content 25.1%, LTV Brookfield viscosity 12.8 cps (No.1 spindle at 60 rpm), pH of 2.6, and average particle size of 153 nm (referred to hereinafter as Dispersant D1).

EXAMPLE 4

Preparation of Latex Paint

A pigment grind is prepared using a HSD-type grinding apparatus. In sequence, 38.0 g of water, 3.3 g of a 28% aqueous ammonia solution, and 1.6 g of Dispersant D1 from Example 3 are added to the grinding apparatus with low agitation. Next, 123.7 g of TiPure R-706 opacifying pigment pigment (DuPont) is added to the grinding apparatus, while the agitation is increased. The mixture is ground for approximately 1 hour, or until a fineness of grind of 8 Hegman is obtained. The agitation is reduced and 14.5 g of ethylene glycol and 1 g of Sher-Defoam™ (a proprietary defoamer of the assignee of the present invention) are added.

An additive premix is prepared in a first mix tank. First, 108 g of water is added to the first mix tank, and then, under agitation 1.5 g of cellosize QP-300H (hydroxyethyl cellulose), 0.5 g of Proxel GXL biocide, 1 g of 28% aqueous ammonia solution, 1 g of Sher-Defoam™, 12 g of Texanol-12 carbon ester alcohol, and 9.26 g of ethylene glycol are added.

A thickener premix is prepared in a second mix tank. First, 117.7 g of water are added to the second mix tank, and then, under agitation, 22 g of Polyphobe® 102 thickener and 1.5 g of 28% aqueous ammonia solution are added to the tank.

After the pigment grind, the additive premix, and the thickener premix have been prepared, 333.8 g of the Core-Shell Binder B1 from Example 1, 2 g of Sher-Defoam™, and 100 g of Ropaque® OP-96 microsphere emulsion are added to the pigment grind under agitation. After the foregoing has been mixed for about 10 minutes, the additive premix and the thickener premix are added under agitation. Next, the following ingredients are added in order: Triton®N-57 (a surfactant from Union Carbide), 90 g of an acrylic copolymer latex, 2 g of Sher-Defoam™, and 13 g of Celite®499 (diatomaceous earth from Johns Manville). The foregoing is then mixed until it is homogeneous, thereby yielding a paint composition hereinafer referred to as the "Inventive Paint Composition".

COMPARATIVE EXAMPLE 1

Preparation of Core-Shell Binder Latex With Thick Shell

A two-liter resin flask with monomer addition inlets and a water jacket is provided. The resin flask is equipped with a four-blade stainless steel mechanical stirrer, Claisen connecting tube, Friedrichs water condenser, nitrogen sparge and bubble trap, and a thermometer. The resin flask is charged with 500 g of water, 14 g of Aerosol A102 (a surfactant from CYTEC), and 0.4 g ammonium persulfate. A first monomer mixture is prepared by mixing together 228 g of butyl acrylate and 944 g of vinyl acetate. The first monomer mixture is added to a stirred mixture of 360 g deionized water, 40 g of Aerosol A102 in a 2-liter monomer feed cylinder. In a separate feed cylinder, a first initiator solution is prepared by dissolving 3.2 g of ammonium persulfate in 200 g of water. Under nitrogen purge, the resin flask is heated to 73° C. by circulating temperature-controlled water through the jacket. After the temperature of the charge in the resin flask has reached 73° C., 10% of the first monomer mixture is added to the resin flask. Ten minutes later, feeds of the first initiator solution and the first monomer mixture are started. With continuous stirring, the first initiator solution and the remainder of the first monomer mixture are fed to the resin flask over a 3-hour period, while the reaction temperature is held at 73° C. The reaction is allowed to proceed at 73° C. for an additional hour after completion of the feed of the first monomer mixture.

A second monomer mixture is prepared by mixing together 21.5 g of butyl acrylate, 84.2 g of vinyl acetate, and 11.5 g of methacrylic acid. A second initiator solution is prepared by dissolving 0.54 g of ammonium persulfate in 35.84 g of water. The second monomer mixture is fed to the resin flask over a 20 minute period, and then the second initiator solution is charged to the resin flask. The reaction is allowed to proceed at 73° C. for an additional hour after completion of the feed of the second monomer mixture. A 15% ammonium hydroxide solution is added to the reaction mixture to provide it with a pH of 5. The resulting product shall hereinafter be referred to as "Core-Shell Binder B2".

COMPARATIVE EXAMPLE 2

Preparation of Comparative Paint Composition 1

A latex paint was prepared substantially in accordance with Example 4, except that Core-Shell Binder B2 from Comparative Example 1 is used in place of Core-Shell Binder B1 from Example 1. The resulting latex paint is referred to hereinafter as "Comparative Paint Composition 1".

COMPARATIVE EXAMPLE 3

Preparation of Comparative Paint Composition 2

An additive premix is prepared in a first mix tank. First, 108 g of water is added to the first mix tank, and then, under agitation 1.5 g of cellosize QP-300H (hydroxyethyl cellulose), 0.5 g of Proxel GXL biocide, 1 g of 28% aqueous ammonia solution, 2 g of Sher-Defoam™, 12 g of Texanol-12 carbon ester alcohol, and 23.76 g of ethylene glycol are added.

A thickener premix is prepared in a second mix tank. First, 117.7 g of water are added to the second mix tank, and then, under agitation, 22 g of Polyphobe® 102 thickener and 1.5 g of 28% aqueous ammonia solution are added to the tank.

After the additive premix, and the thickener premix have been prepared, 333.8 g of UCAR 6045 (a vinyl acrylic latex without acid modification available from Union Carbide), 2 g of Sher-Defoam™, and 100g of Ropaque® OP-96 microsphere emulsion are added to 165.0 g of R-746 titanium dioxide slurry, (Dupont). After the foregoing has been mixed for about 10 minutes, the additive premix and the thickener premix are added under agitation. Next, the following ingredients are added in order: Triton®N-57 (a surfactant from Union Carbide), 90 g of an acrylic copolymer latex, 2 g of Sher-Defoam™, and 13 g of Celite®499 (diatomaceous earth from Johns Manville). The foregoing is then mixed until it is homogeneous, thereby yielding a paint composition hereinafer referred to as the "Comparative Paint Composition 2".

TESTING

The Inventive Paint Composition, the Comparative Paint Composition 1, and the Comparative Paint Composition 2 were tested for scrub-resistance and opacity.

Scrub resistance was determined using ASTM D 2486-89 with seven day cure. Scrub-resistance is reported as the number of scrubs (cycles) until failure. Opacity in the form of Kubelka-Munk scattering coefficients is determined for all three paint compositions using a modification of ASTM D 2805-70 as described in J. E. Mchutt and H. L. Ramsay in *American Paint and Coatings Journal*, April, 1988, P. 46, by the weight drawdown method.

The results of the foregoing tests are set forth in the following table:

OPACITY/SCRUB RESISTANCE

| Composition | Scrub-Resistance (scrubs) | Opacity (S/mil) |
| --- | --- | --- |
| Inventive Paint Composition | 456 | 2.25 |
| Comparative Paint Composition 1 | 355 | 2.34 |
| Comparative Paint Composition 2 | 460 | 2.09 |

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A water-borne paint composition comprising:

a core-shell polymer having acid functionality and comprising a shell and a core, wherein the weight of the shell is less than 10% of the weight of the core;

a polymer polymerized from a group of monomers comprising an unsaturated carboxylic acid monomer, a monoethylenically unsaturated monomer different from the carboxylic acid monomer, and a macromonomer including a hydrophobic portion and an alkoxylated portion that is polymerizable with the carboxylic acid monomer and the monoethylenically unsaturated monomer; and an opacifying pigment.

2. The water-borne paint composition of claim 1, wherein the core and the shell of the core-shell polymer are respectively polymerized from first and second sets of monomers, each of which comprise a vinyl monomer and an acrylic monomer.

3. The water-borne paint composition of claim 2, wherein the first and second sets of monomers each comprise at least 48 weight percent of one or more vinyl monomers.

4. The water-borne paint composition of claim 2, wherein the first set of monomers comprises from about 10 to about 50 weight percent of an acrylic ester monomer and from about 50 to about 90 weight percent of a vinyl ester monomer; and wherein the second set of monomers comprises from about 10 to about 50 weight percent of an acrylic ester monomer, from about 48 to about 88 weight percent of a vinyl ester monomer, and from about 2 to about 20 weight percent of an acrylic acid.

5. The water-borne paint composition of claim 4, wherein in the first set of monomers, the vinyl ester monomer is vinyl acetate and the acrylic ester monomer is butyl acrylate, and wherein in the second set of monomers, the vinyl ester monomer is vinyl acetate, the acrylic ester monomer is butyl acrylate and the acrylic acid is methacrylic acid.

6. The water-borne paint composition of claim 1, wherein the macromonomer is represented by the formula:

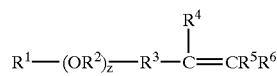

wherein:

$R^1$ is a monovalent residue of a substituted or unsubstituted hydrophobe compound;

each $R^2$ is the same or different and is a substituted or unsubstituted divalent hydrocarbon residue;

$R^3$ is a substituted or unsubstituted divalent hydrocarbon residue; and z is a value of 0 to 150.

7. The water-borne paint composition of claim 6, wherein the unsaturated carboxylic acid monomer is methacrylic acid and the monoethically unsaturated monomer different from the carboxylic acid monomer is ethyl acrylate.

8. The water-borne paint composition of claim 1, wherein the opacifying pigment comprises titanium dioxide.

9. The water-borne paint composition of claim 1, further comprising hollow polymeric microspheres.

10. The water-borne paint composition of claim 1, wherein the weight of the shell is less than 9% of the weight of the core.

11. A water-borne paint composition comprising:

a binder latex comprising a core-shell polymer with acid functionality, said core-shell polymer having a core and a shell respectively polymerized from first and second sets of monomers, each of said first and second sets of monomers comprising at least 48 weight percent of one or more vinyl monomers, and wherein the weight of the shell is less than 10% of the weight of the core;

a dispersant polymer polymerized from a group of monomers comprising a macromonomer having a hydrophobic portion and an alkoxylated portion; and an opacifying pigment.

12. The water-borne paint composition of claim 11, wherein the first set of monomers comprises from about 10 to about 50 weight percent of an acrylic ester monomer and from about 50 to about 90 weight percent of a vinyl ester monomer; and wherein the second set of monomers comprises from about 10 to about 50 weight percent of an acrylic ester monomer, from about 48 to about 88 weight percent of a vinyl ester monomer, and from about 2 to about 20 weight percent of an acrylic acid.

13. The water-borne paint composition of claim 12, wherein in the first set of monomers, the vinyl ester monomer is vinyl acetate and the acrylic ester monomer is butyl acrylate, and wherein in the second set of monomers, the vinyl ester monomer is vinyl acetate, the acrylic ester monomer is butyl acrylate, and the acrylic acid is methacrylic acid.

14. The water-borne paint composition of claim 11, wherein the second set of monomers comprises from about 2 to about 20 weight percent of one or more acid functional monomers.

15. The water-borne paint composition of claim 11, wherein the first and second sets of monomers do not include a monomer having latent cross-linking capability.

16. The water-borne paint composition of claim 15, wherein the group of monomers from which the dispersant polymer is formed does not include a monomer having latent cross-linking capability.

17. The water-borne paint composition of claim 11, wherein the opacifying pigment comprises titanium dioxide.

18. The water-borne paint composition of claim 17, further comprising an extender selected from the group consisting of polymeric microspheres, diatomaceous earth, and mixtures of the foregoing.

19. The water-borne paint composition of claim 18, further comprising a thickener polymer that is the aqueous emulsion reaction product of an unsaturated carboxylic acid monomer, a monoethylenically unsaturated monomer different from the carboxylic acid monomer, and a macromonomer comprising a hydrophobic portion and an alkoxylated portion.

20. The water-borne paint composition of claim 11, wherein the group of monomers from which the dispersant polymer is formed further comprises an unsaturated carboxylic acid monomer, and a monoethically unsaturated monomer different from the carboxylic acid monomer.

* * * * *